(12) United States Patent
Line et al.

(10) Patent No.: US 9,802,535 B2
(45) Date of Patent: Oct. 31, 2017

(54) SEAT HAVING AMBIENT LIGHTING

(71) Applicant: Ford Global Technologies, LLC, Dearborn, MI (US)

(72) Inventors: Johnathan Andrew Line, Northville, MI (US); Keith Allen Godin, Dearborn, MI (US); Sean David Fannin, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 14/697,291

(22) Filed: Apr. 27, 2015

(65) Prior Publication Data

US 2016/0311367 A1 Oct. 27, 2016

(51) Int. Cl.
  *B60Q 3/02* (2006.01)
  *B60Q 3/233* (2017.01)
  *B60N 2/44* (2006.01)
  *B60Q 3/80* (2017.01)

(52) U.S. Cl.
  CPC ............. *B60Q 3/233* (2017.02); *B60N 2/44* (2013.01); *B60Q 3/80* (2017.02)

(58) Field of Classification Search
  CPC ...... B60Q 3/0223; B60Q 3/233; A47C 7/725; B60N 2/68
  See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — David R Dunn
*Assistant Examiner* — Tania Abraham
(74) *Attorney, Agent, or Firm* — Vichit Chea; Price Heneveld LLP

(57) ABSTRACT

A vehicle seating assembly includes a seatback. A support frame is partially enclosed by a seatback panel assembly. A seatback cushion assembly is supported on a seatback carrier and is proximate the seatback panel assembly. An external peripheral gap is defined between the seatback panel assembly and the seatback cushion assembly. A light source is defined in the seatback carrier and is configured to emit light into the external peripheral gap. A seat includes a support frame partially enclosed by a panel assembly. A seat cushion assembly is proximate the panel assembly. An external peripheral gap is defined between the panel assembly and the seat cushion assembly. A light source is defined in a seat carrier and is configured to emit light into the external peripheral gap.

17 Claims, 8 Drawing Sheets

(56) References Cited

U.S. PATENT DOCUMENTS

| | | | |
|---|---|---|---|
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,709,448 A * | 1/1998 | Jennings ............... B60Q 3/004 362/156 |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Matsumoto et al. |
| 6,550,856 B1 | 4/2003 | Ganser et al. |
| 6,554,365 B2 * | 4/2003 | Karschin ............... A47C 7/40 297/216.13 |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,811,227 B2 * | 11/2004 | Andersson ............. B60N 2/502 297/216.1 |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,077,478 B2 * | 7/2006 | Nakamura ............... B60N 2/68 297/440.15 |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,293,831 B2 | 11/2007 | Greene |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,395 B2 * | 10/2009 | Wiedeman ............... B60N 2/68 296/64 |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,162,519 B2 * | 4/2012 | Salter ..................... B60Q 3/004 362/488 |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,215,810 B2 * | 7/2012 | Welch, Sr. ............. B60Q 3/004 362/488 |
| 8,226,165 B2 | 7/2012 | Mizoi |
| 8,342,607 B2 | 1/2013 | Hofmann et al. |
| 8,754,426 B2 * | 6/2014 | Marx ...................... F21K 9/00 257/88 |
| 8,857,908 B2 * | 10/2014 | Brncick ................ B60N 2/0232 297/284.1 |
| 2004/0195870 A1 | 10/2004 | Bohlender et al. |
| 2005/0200166 A1 | 9/2005 | Noh |
| 2005/0248189 A1 * | 11/2005 | Prasatek ................. B60N 2/68 297/188.04 |
| 2006/0043777 A1 | 3/2006 | Friedman et al. |
| 2007/0120401 A1 | 5/2007 | Minuth et al. |
| 2007/0228786 A1 * | 10/2007 | Greene ..................... B60N 2/02 297/217.6 |
| 2008/0174159 A1 | 7/2008 | Kojima et al. |
| 2009/0066122 A1 | 3/2009 | Minuth et al. |
| 2009/0165263 A1 | 7/2009 | Smith |

(56) References Cited

U.S. PATENT DOCUMENTS

| | | |
|---|---|---|
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0343072 A1 | 12/2013 | Ehrmann et al. |
| 2014/0021754 A1* | 1/2014 | Jung ................. B60N 2/44 297/217.6 |
| 2015/0028634 A1* | 1/2015 | Scherello ............ B60N 2/4802 297/163 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

\* cited by examiner

SEAT HAVING AMBIENT LIGHTING

FIELD OF THE DISCLOSURE

The present disclosure generally relates to a vehicle seating assembly, and more particularly to a vehicle seat having ambient lighting.

BACKGROUND OF THE DISCLOSURE

A variety of lighting approaches are implemented in vehicles today. Such approaches can include ambient lighting in a vehicle for assisting an occupant in performing an action. Ambient lighting within vehicles is a popular feature offered by many vehicle manufacturers and current ambient vehicle lighting units are provided on various vehicle structures to enhance the driving experience. Current ambient vehicle lighting systems may have drawbacks, such as complicated construction, large packaging size, and the lack of a warning system in vehicle seats for critical driving conditions. Therefore, there is a need for ambient functional lighting in vehicle seats that is not hindered by the above-mentioned drawbacks.

SUMMARY OF THE DISCLOSURE

According to one aspect of the present disclosure, a vehicle seating assembly includes a seatback. A support frame is partially enclosed by a seatback panel assembly. A seatback cushion assembly is supported on a seatback carrier and is proximate the seatback panel assembly. An external peripheral gap is defined between the seatback panel assembly and the seatback cushion assembly. A light source is defined in the seatback carrier and is configured to emit light into the external peripheral gap. A seat includes a support frame partially enclosed by a panel assembly. A seat cushion assembly is proximate the panel assembly. An external peripheral gap is defined between the panel assembly and the seat cushion assembly. A light source is defined in a seat carrier and is configured to emit light into the external peripheral gap.

According to another aspect of the present disclosure, a vehicle seating assembly includes a support frame partially enclosed by a seatback panel assembly. A seatback cushion assembly is supported on a seatback carrier and is proximate the seatback panel assembly. An external peripheral gap is defined between the seatback panel assembly and the seatback cushion assembly. A light source is defined in the seatback carrier and is configured to emit light into the external peripheral gap.

According to yet another aspect of the present disclosure, a vehicle seating assembly includes a support frame partially enclosed by a panel assembly. A seat cushion assembly is proximate the panel assembly. An external peripheral gap is defined between the panel assembly and the seat cushion assembly. A light source is defined in a seat carrier and is configured to emit light into the external peripheral gap.

According to still another aspect of the present disclosure, a vehicle seating assembly includes an external peripheral gap defined between a cushion assembly and a seat panel assembly of the vehicle seating assembly. A light source is disposed on one of the cushion assembly and the seat panel assembly and projects light into the external peripheral gap defined between the cushion assembly and the seat panel assembly of the vehicle seating assembly. The ambient light that is emitted can be used for a variety of purposes, including mood lighting, ambient lighting, emergency lighting, warning lighting, etc. The use of the lighting in the external peripheral gap provides a safer environment to the driver and passengers in the vehicle.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
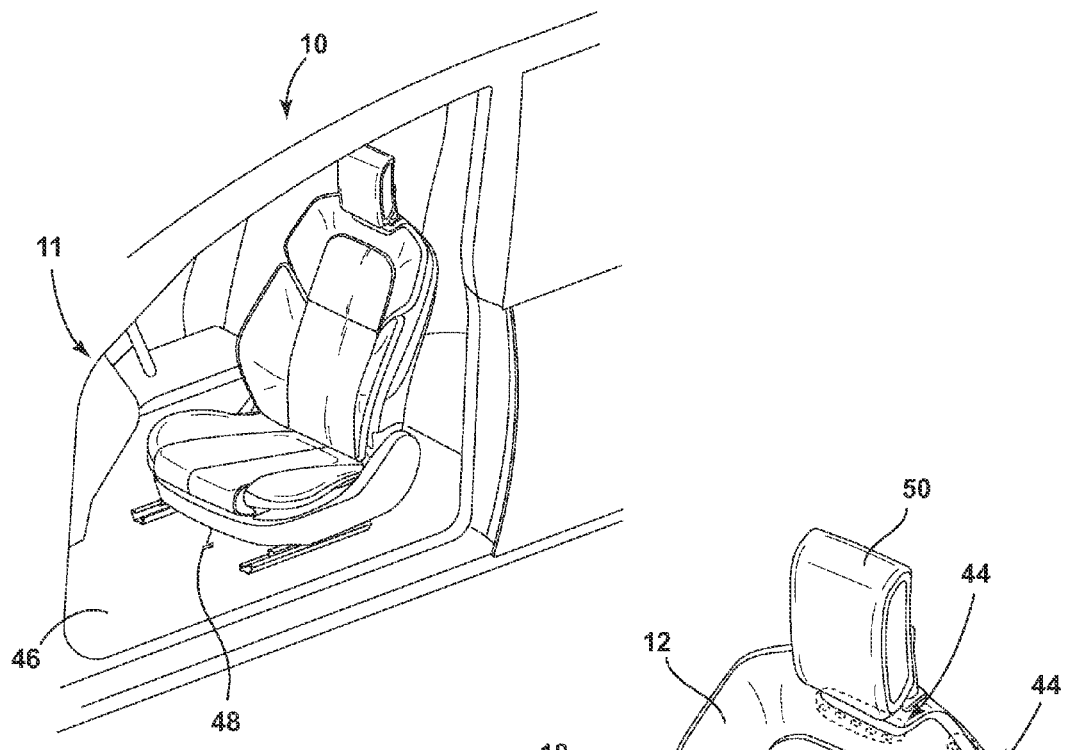
FIG. 1 is a top perspective view of one embodiment of a vehicle seating assembly of the present disclosure disposed in a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-9, reference numeral 10 designates a vehicle having a vehicle seating assembly 11 that includes a seatback 12. A support frame 14 is provided and is partially enclosed by a seatback panel assembly 16. A seatback cushion assembly 18 is supported on a seatback carrier 20 and is proximate the seatback panel assembly 16. A first external peripheral gap 21 is defined between the seatback panel assembly 16 and the seatback cushion assembly 18. A first light source 22 is defined in the seatback carrier 20 and is configured to emit light into the external peripheral gap 21. A seat 24 is also provided and includes a support frame 26 partially enclosed by a seat panel assembly 28. A seat cushion assembly 30 is proximate the seat panel assembly 28. A second external peripheral gap 32 is defined between the seat panel assembly 28 and the seat cushion assembly 30. Another light source 22 is defined in a seat carrier 34 and is configured to emit light into the second external peripheral gap 32.

Modern vehicle interiors are provided with lights for the safety and comfort of the driver and passengers. In its simplest configuration, vehicle interior lighting is provided in the form of a dome lamp mounted in the approximate center of the vehicle ceiling. While typically providing functional and adequate lighting, the dome lamp arrangement creates shadows and leaves many areas of the interior without direct illumination. In an effort to improve vehicle interior lighting, additional lights have been included in a variety of places. For example, lights have been fitted to the underside of instrument panels as well as under vehicle seats to illuminate the floor and footwells. Lights have also been fitted to utilitarian areas, such as cupholders. Unlike the dome light arrangement, these lights provide indirect or ambient lighting to the vehicle interior. Such ambient lighting may be configured to provide light to almost all areas left dark by conventional dome lights, thus adding to comfort and safety.

While providing an improvement in vehicle lighting, known ambient lighting typically adds complexity in the forms of lighting elements (tubes, bulbs, or light emitting diodes [LEDs), switches, controllers, and wiring. According to known arrangements, a relatively large number of discrete components are required to provide the desired level of lighting. Regardless of the design, according to the disclosure set forth herein, several individual ambient lighting components are disposed at various strategic locations in the interior, thereby complicating assembly of the vehicle as a whole. Specifically, wiring for under-seat lights is generally installed before the vehicle carpet is installed. Light elements for both under-instrument panel and under-seat lights are generally installed before the instrument panel or the seat is installed in the vehicle. This installation arrangement is cumbersome for assembly processes and adds significant expenses in both the planning and execution of vehicle assembly. In an effort to reduce the scheduling and planning burdens, some of these components, such as the wiring harness, are installed in the vehicle whether or not the customer orders optional ambient lighting, thus adding to vehicle cost. To a certain extent, the application of ambient lighting systems has been simplified by assemblies offered in the aftermarket where ambient lighting packages for vehicle interiors are available. These systems, however, are difficult to install and require that the necessary wiring be spliced at inconvenient areas, such as at the cigarette lighter for footwell lighting and at the PRNDL (park, reverse, neutral, drive, low) mechanism for cupholder lighting.

The present disclosure represents an advancement in the art of interior vehicle lighting by providing an ambient lighting system for the vehicle 10. According to the present disclosure, the vehicle seating assembly 11 may be configured and employed to provide a complete, comfortable, and inviting ambient lighting environment within the vehicle 10 and to allow a user to see around a periphery of the vehicle 10 when a door of the vehicle 10 is opened in the dark or evening. The vehicle seating assembly 11 (FIGS. 1-3) of the present disclosure includes light sources 22 strategically positioned to illuminate side shields and inner close out areas of the seat carrier 34 for the vehicle seating assembly 11. The light sources 22 may include light emitting diodes (LEDs), although other lighting elements, such as tube and bulb elements, may be used in the alternative, or may be used in combination with the LEDs. Further, apertures through which the light sources 22 emit light may be formed directly in a seatback carrier and seat carrier of the seat or the aperture may be formed in modules attached to the vehicle seating assembly. The vehicle seating assembly 11 of the present disclosure provides a vehicle manufacturer with a simplified and cost-reducing way of adding ambient lighting to the interior of the vehicle 10. Providing a vehicle seating assembly 11 having integral ambient light sources 22 helps to reduce or eliminate the inconvenience and cost at both the planning and assembly stages of the vehicle seating assembly 11. The component cost is further reduced by using fewer light sources 22, thereby providing quality illumination.

With reference again to FIGS. 4-6 of the vehicle seating assembly 11, the present disclosure shows and describes the use of a variety of light sources 22 disposed in the vehicle seating assembly 11. The light sources 22 are located behind independent thigh extensions 38 on sides of the light sources 22. The light sources 22 may include a lighting module, such as a light-emitting diode (LED) module 40 (FIG. 6) that provides a high degree of luminosity while drawing a relatively small amount of power from the vehicle 10. The LED module 40 is also relatively small and inexpensive and has a long life. However, as previously noted, other known light sources 22, such as tubes or bulbs, may be substituted for the LED modules 40. Alternatively, the LED module 40 can be used in conjunction with alternate light sources 22. The illustrated LED modules 40 for each seat 24 include one or more seat cushion modules 42 for use with the seat cushion assembly 30 and one or more seatback cushion modules 44 for use with the seatback cushion assembly 18. The light emitted from the LED modules 40 (and from all of the LED modules noted herein) may be directed as desired to illuminate a particular area of the interior of the vehicle 10. For example, the LED modules 40 may be adjusted so that the emitted light is directed downward toward reflective shields 47 of the vehicle seating assembly 11. Alternatively, light from the LED modules 40 may be directed inward toward the second external peripheral gap 32, or when positioned on the seatback 12, can be directed upwards toward a headliner of the vehicle 10. The LED modules 40, such as the LED module 40 shown in FIG. 6, may also include a connecting flange 41 to secure the LED module 40 with the seat carrier 34.

Figure 2:
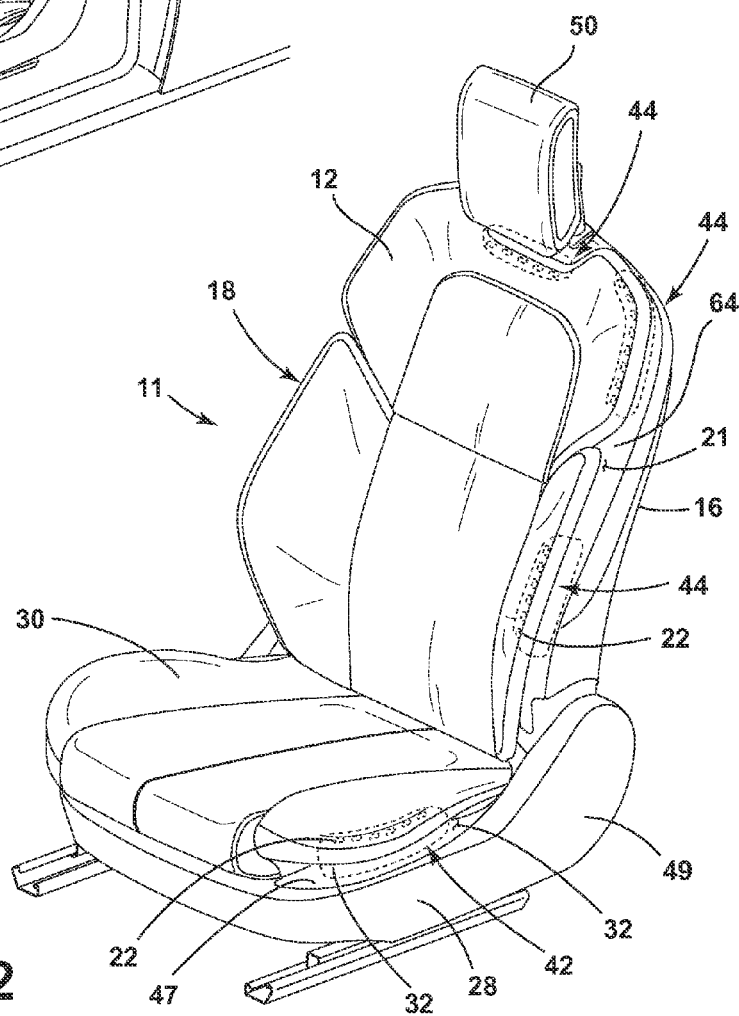
FIG. 2 is an enlarged top perspective view of the vehicle seating assembly of FIG. 1.
Figure 3:
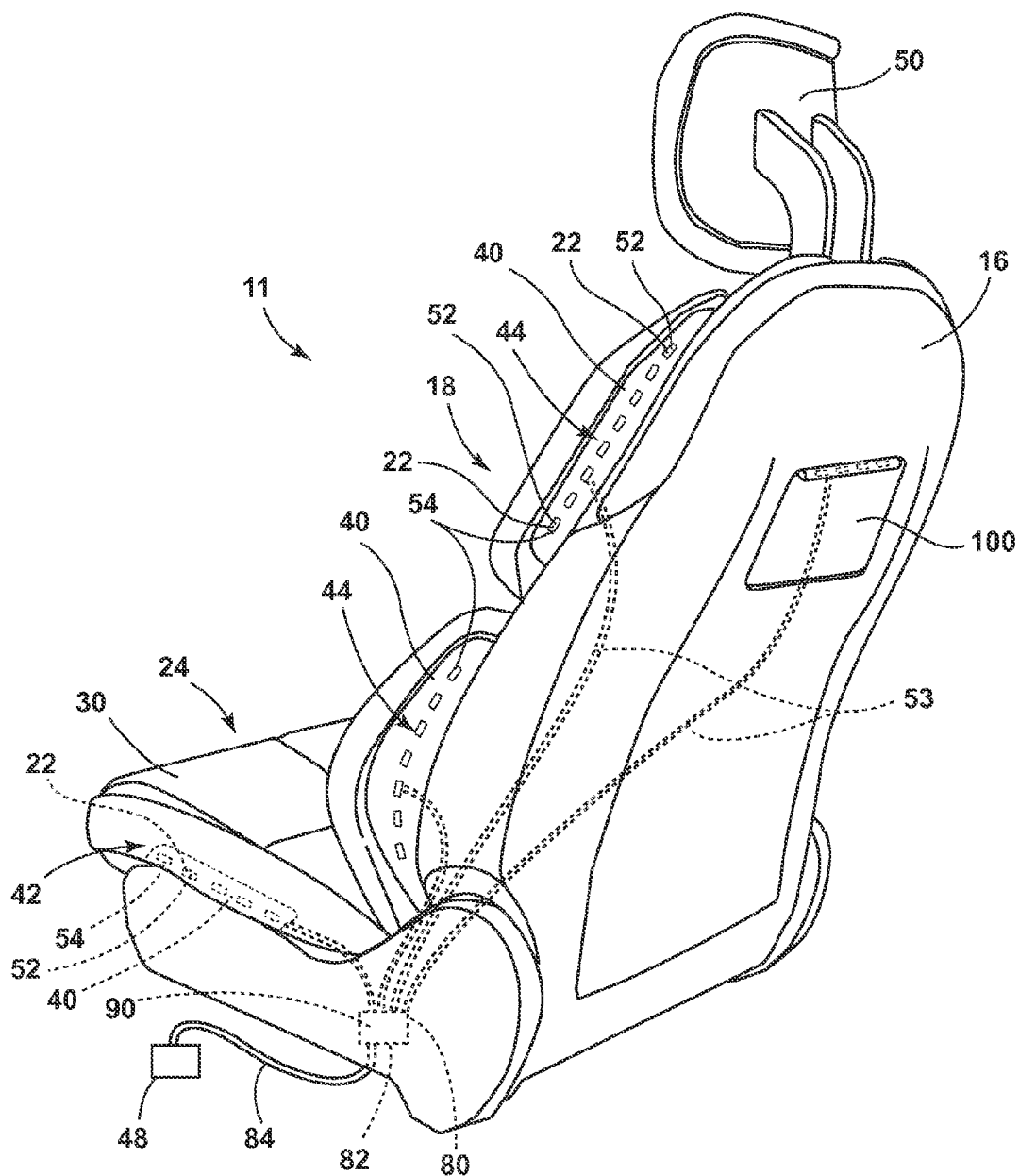
FIG. 3 is a rear perspective view of one embodiment of a vehicle seating assembly of the present disclosure.

As shown in FIGS. 1 and 2, on assembly, during the manufacturing process, the vehicle seating assembly 11 is attached to a floor 46 of the vehicle 10, and appropriate electrical connection of the vehicle seating assembly 11 is made to a main wiring harness 48 of the vehicle 10. Thereafter, a headrest 50 of the vehicle seating assembly 11 may be installed on the vehicle seating assembly 11 in the appropriate manner. It is contemplated that the main wiring harness 48 may be positioned in or under the seat 24 and be permanently or removably coupled with a vehicle seating assembly harness as disclosed in further detail below.

Figure 4:
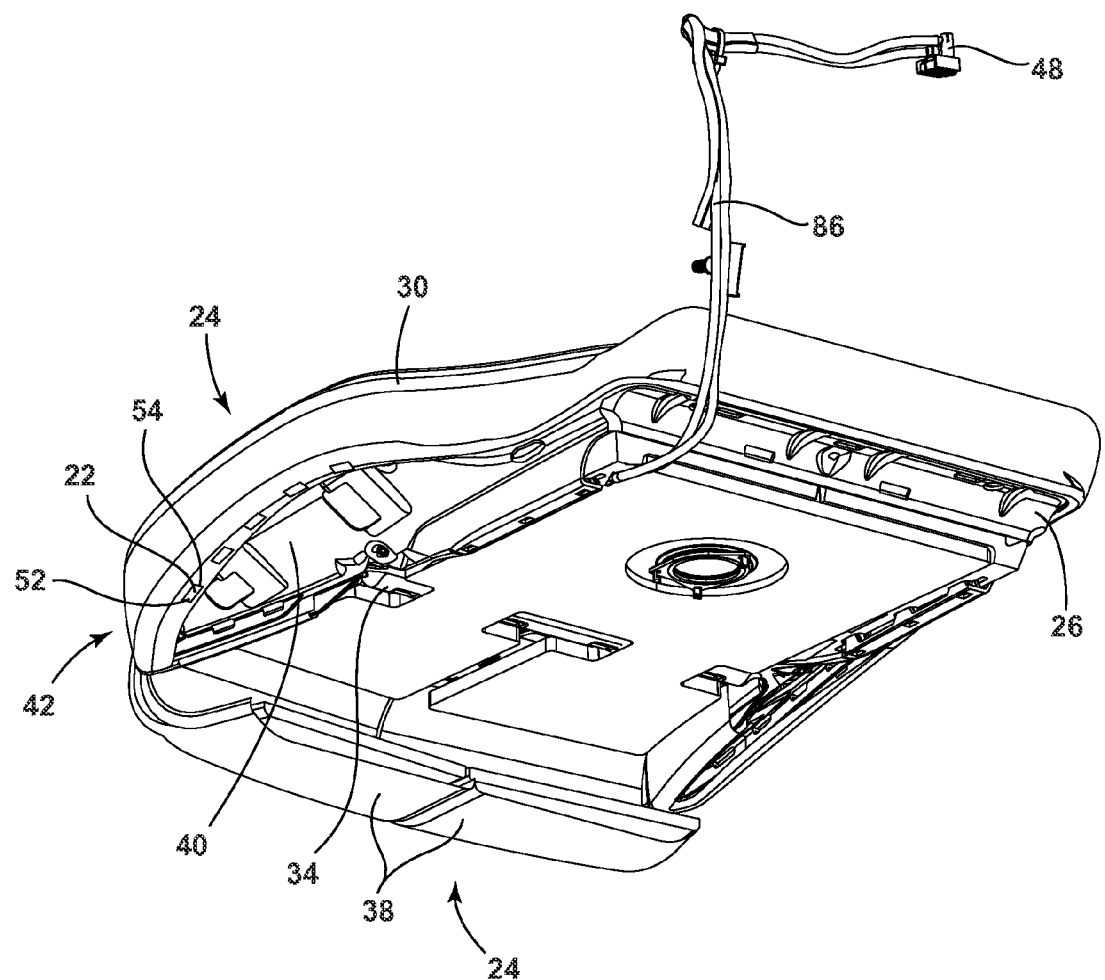
FIG. 4 is a bottom perspective view of the seat panel assembly of FIG. 3.
Figure 5:
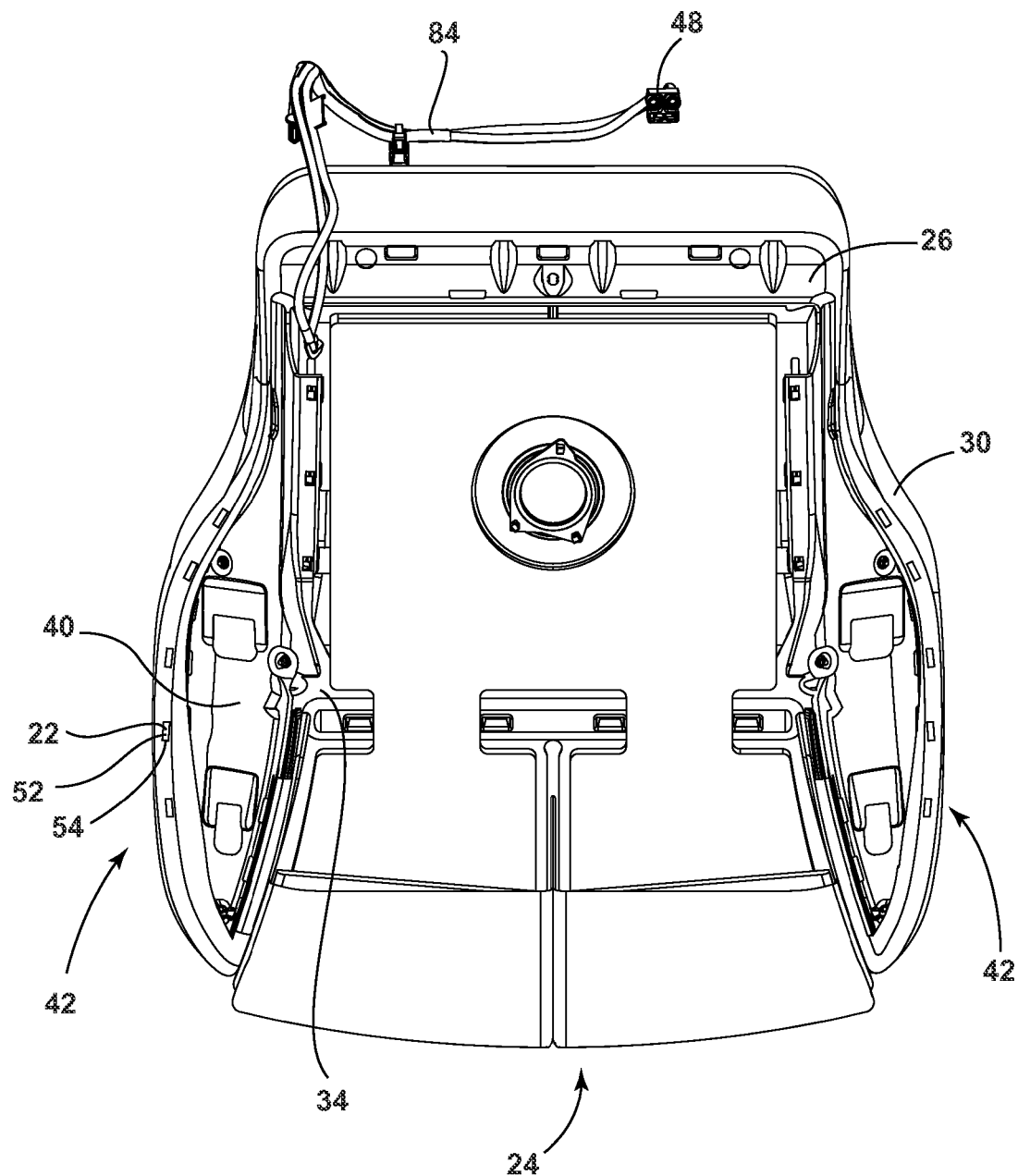
FIG. 5 is a top plan view of one embodiment of a seat panel assembly of the present disclosure.
Figure 6:
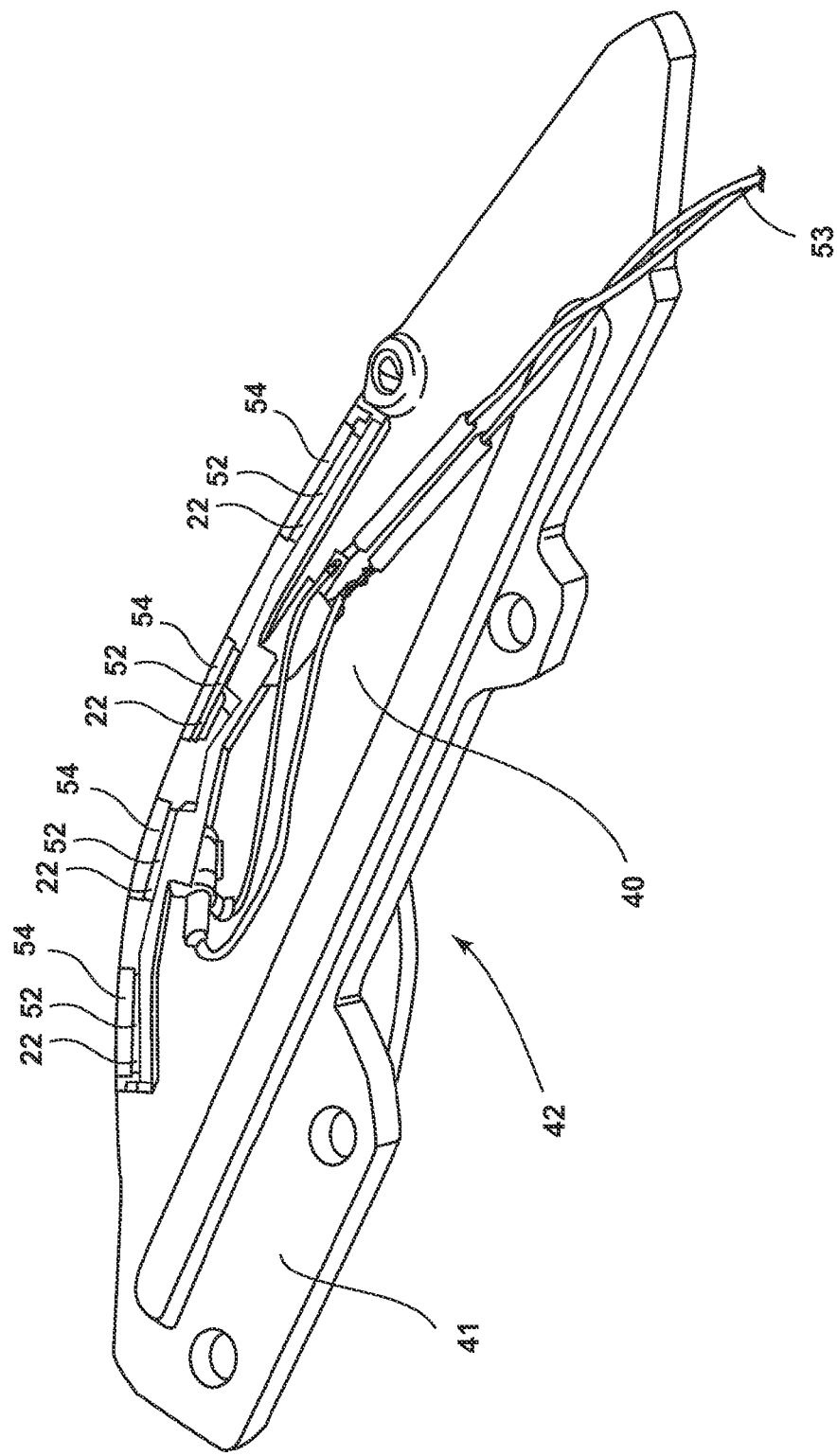
FIG. 6 is a top perspective view of one embodiment of a lighting device configured to emit light into an external peripheral gap of the vehicle seating assembly of the present disclosure.

With reference now to FIGS. 4-6, the seat cushion assembly 30 includes a coverstock 31 and one or more LED modules 40 disposed in one or more seat cushion modules 42, which have light pipes 52 (FIG. 6) that extend to various areas surrounding the underside of the seat cushion assembly 30 at a periphery thereof, as shown in FIG. 6. The light pipes 52 terminate at apertures 54 disposed on the underside of the seat cushion assembly 30 so that light will be directed to the lower portion of the seat carrier 34 proximate the second external peripheral gap 32 defined between the seat panel assembly 28 and the seat cushion assembly 30. The light sources 22 are powered by power cables 53 extending from the main wiring harness 48. Upon viewing the vehicle seating assembly 11 from the top, a user will not be able to readily see the light sources 22 as the light sources 22 are placed on the underside of the edge of the seat cushion assembly 30.

Figure 7:
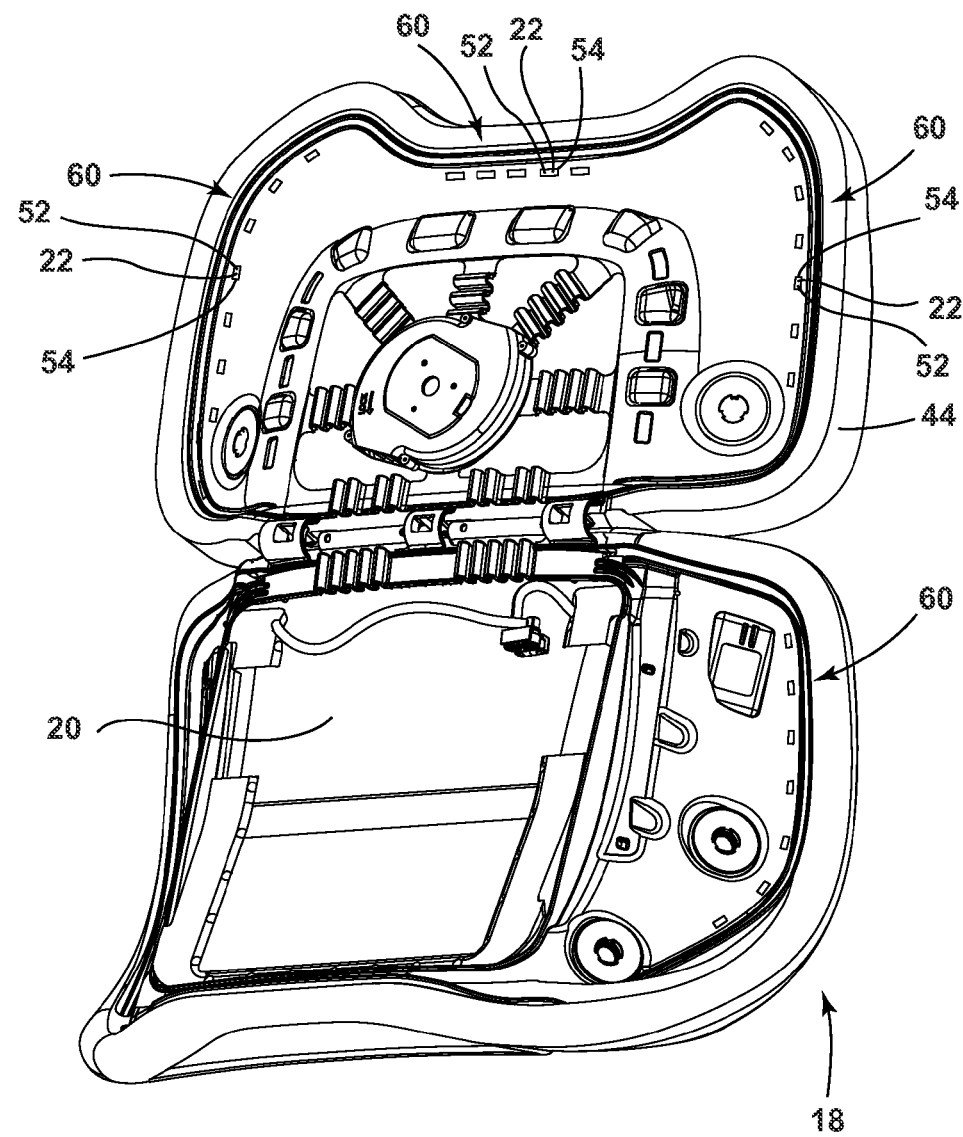
FIG. 7 is a rear perspective view of one embodiment of a seatback cushion assembly of the present disclosure.
Figure 8:
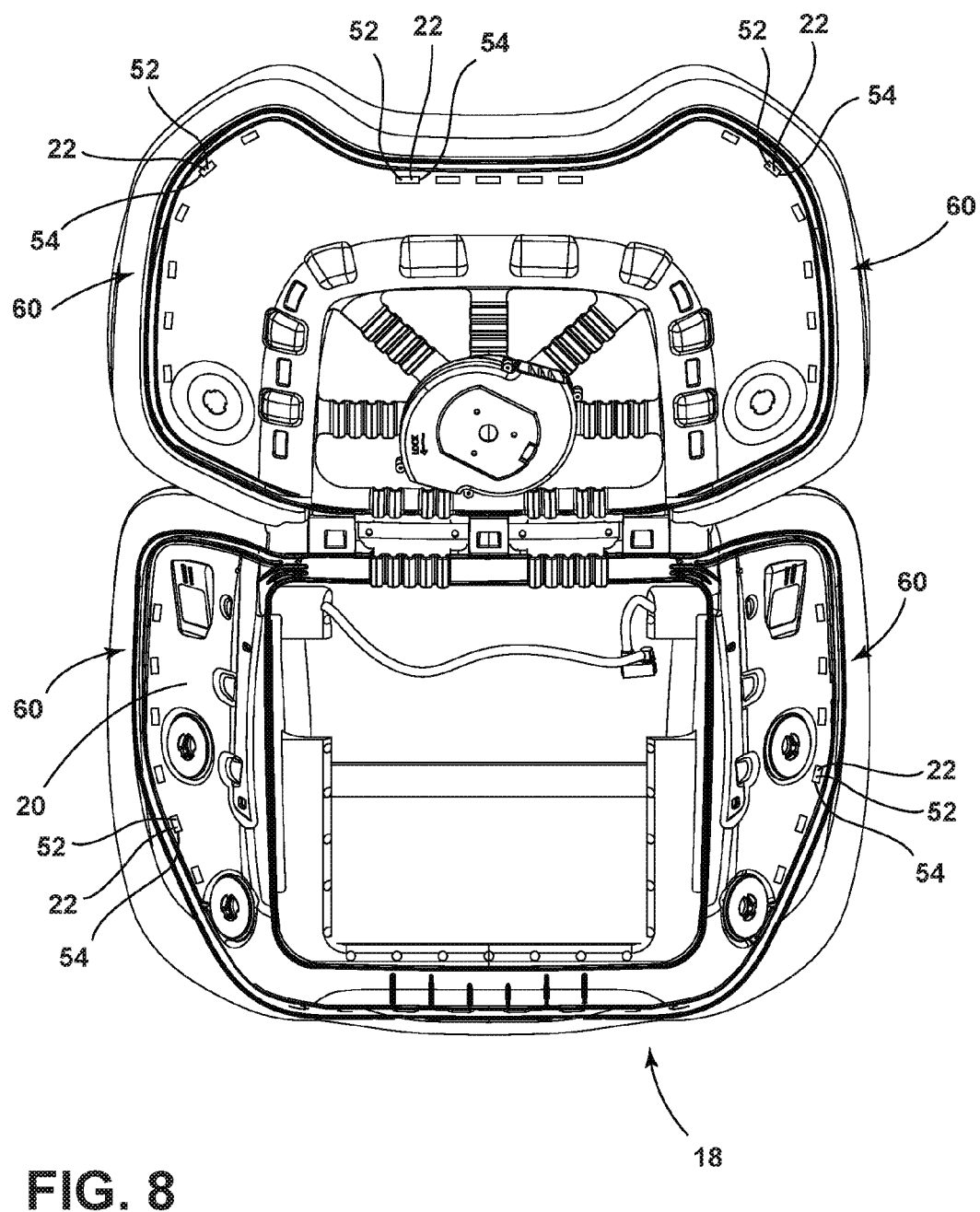
FIG. 8 is a rear top perspective view of one embodiment of a seatback cushion assembly of the present disclosure.
Figure 9:
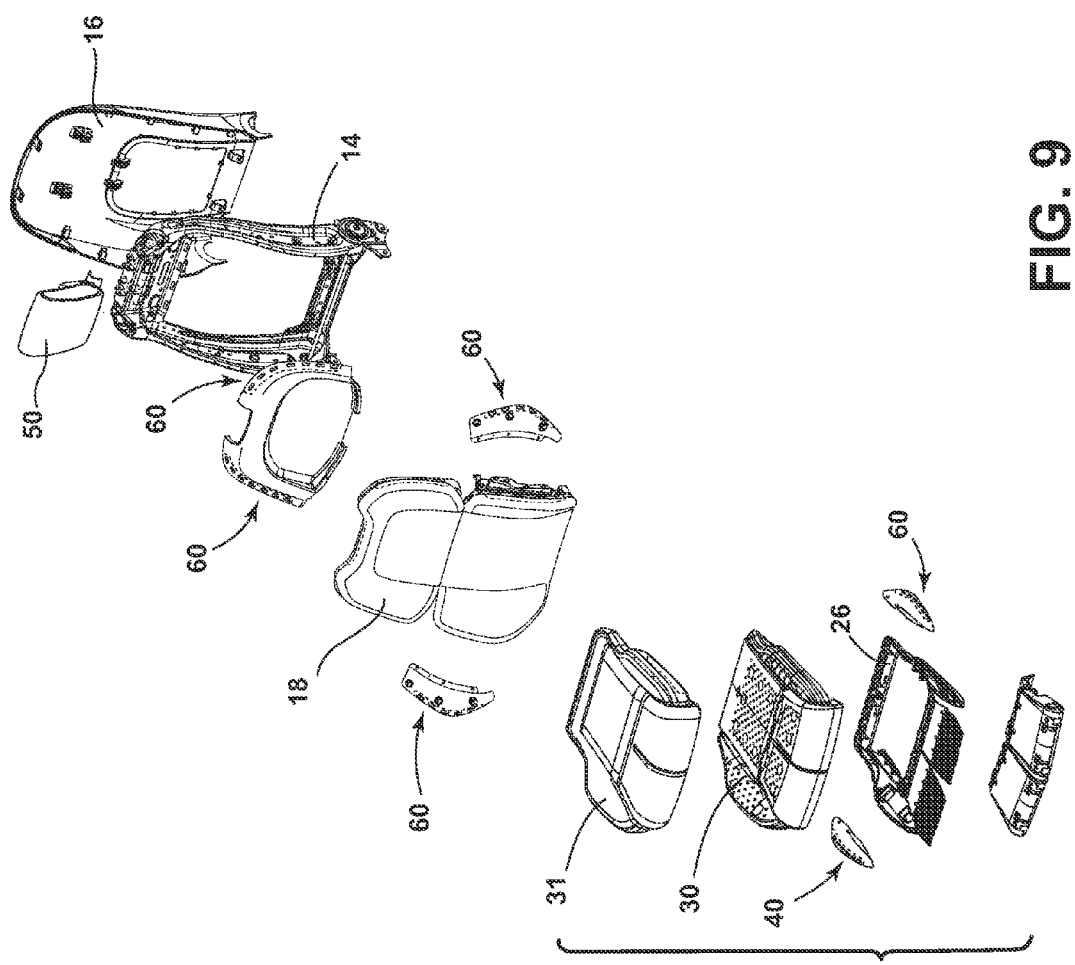
FIG. 9 is a top perspective exploded view of one embodiment of a vehicle seating assembly of the present disclosure.

With reference now to FIGS. 7-9, the seatback cushion assembly 18 includes the seatback cushion modules 44, each including one or more LED modules 40. The seatback cushion modules 44 are positioned at various areas proximate the back edge of the seatback carrier 20 at a periphery 60 of the seatback carrier 20. The seatback cushion modules 44 direct light toward an inner close out 64 of the seatback cushion assembly 18. Like the seat cushion modules 42, each light pipe 52 from the LED modules 40 terminates at the aperture 54 in a rear side of the seatback cushion module 44 so that the light will be directed to the inner close out 64 of the seatback cushion module 44. Upon viewing the vehicle seating assembly 11 from the front, a user will not be able to see the light source 22 as the light source 22 is disposed on the backside of the seatback cushion assembly 18 proximate an edge of the seatback cushion assembly 18. The resulting illumination effect results in the appearance of having the cushions "floating" in air.

A vehicle seating assembly wiring harness 80 is provided to electrically interconnect the seat cushion modules 42 and the seatback cushion modules 44. The vehicle seating assembly wiring harness 80 includes a connector 82 for connection with the main wiring harness 48 of the vehicle 10. The connector 82 may be of the snap-fit type of connector to provide for a quick and definite connection of the vehicle seating assembly wiring harness 80 to the main wiring harness 48 of the vehicle 10. A power line 84 is provided to electrically connect the vehicle seating assembly wiring harness 80 to an LED control module 90 mounted on a vehicle seating assembly base (below the tuning spring/suspension). The power line 84 provides electrical power to the LED control module 90 and to the LED modules 40 according to the illustrated embodiment. Other LED modules may be powered as well.

With reference again to FIG. 3, the seatback panel assembly 16 may include an LED module 40 disposed in a pocket 100. The hard back panel of the seatback panel assembly 16 has a plurality of recessed walls generally defining the storage pocket 100. It is contemplated that the light sources 22 may be disposed in the pocket 100, or may be covered by a flap. Also, the LED module 40 may be disposed in at least one of the walls of the pocket 100 or in the seatback panel assembly 16. In any instance, the LED module 40 is configured to illuminate an inner retaining area of the pocket 100.

As set forth above, several components are contained within each vehicle seating assembly 11, including internal operating components, such as the LED control modules 90, the vehicle seating assembly wiring harness 80, the connector 82, and the array of LED modules 40. It is generally contemplated that the ambient lighting for the vehicle seating assembly 11 may change color, depending on the temperature of the seat 24. For example, the seat 24 could be programmed to display a cool blue color when the seat 24 is still cold, the vehicle 10 has been turned on (possibly through remote start), and when the seat 24 is warmed then the ambient lighting changes to a red color. However, it is understood that a default position for the color of the ambient lighting of the vehicle seating assembly 11 may be a simple white light color. It will also be noted that predefined images may be depicted on any of the seatback carrier, seatback cushion assembly, seat carrier, or seat cushion assembly. The predefined images may include logos, phrases, insignia, etc. The intensity of the light may also vary, depending on whether the vehicle 10 is in drive mode (low intensity) or if the vehicle 10 is in park mode (high intensity). The various modes may be selectable by the user via an electronic switch on the sync display or via voice activation. The foregoing discussion discloses and describes an exemplary embodiment of the present disclosure. As noted above, the variety, position, and number of light sources 22 provided in conjunction with the vehicle seating assembly 11 can be readily altered to meet the requirements of a specific application without deviating from the present disclosure.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seatback including:
      a support frame partially enclosed by a seatback panel assembly;
      a seatback cushion assembly supported on a seatback carrier and proximate the seatback panel assembly, wherein an external peripheral gap is defined between the seatback panel assembly and the seatback cushion assembly; and
      a light source defined in the seatback carrier and configured to emit light from the external peripheral gap in a direction away from a seated occupant; and
   a seat including:
      a support frame partially enclosed by a panel assembly;
      a seat cushion assembly proximate the panel assembly, wherein an external peripheral gap is defined between the panel assembly and the seat cushion assembly; and
      a light source defined in a seat carrier and configured to emit light into the external peripheral gap.

2. The vehicle seating assembly of claim 1, wherein at least one of the seatback carrier and the seat carrier include apertures configured to emit light therethrough.

3. The vehicle seating assembly of claim 1, wherein the light source defined in the seatback carrier and the light source defined in the seat carrier each include a light pipe.

4. The vehicle seating assembly of claim 1, wherein a predefined image is depicted on one of the seatback carrier and the seatback cushion assembly by the light source.

5. The vehicle seating assembly of claim 1, wherein the seatback panel assembly includes a hard back panel having a plurality of recessed walls generally defining a storage pocket, and wherein at least one of the walls includes a light source proximate thereto.

6. The vehicle seating assembly of claim 1, wherein the external peripheral gap extends across a first side, a second side, and a top side of the seatback.

7. A vehicle seating assembly comprising:
   a seatback panel assembly;
   a seatback cushion assembly supported on a seatback carrier proximate the seatback panel assembly, wherein an external peripheral gap is defined between the seatback panel assembly and the seatback cushion assembly; and
   a light source defined in the seatback carrier and configured to emit light in a direction away from an occupant seated on said vehicle seating assembly and into the external peripheral gap.

8. The vehicle seating assembly of claim 7, wherein the seatback carrier includes apertures configured to emit light therethrough.

9. The vehicle seating assembly of claim 7, wherein the light source defined in the seatback carrier includes a light pipe.

10. The vehicle seating assembly of claim 7, wherein a predefined image is depicted on one of the seatback carrier and the seatback cushion assembly by the light source.

11. The vehicle seating assembly of claim 7, wherein the seatback panel assembly includes a hard back panel having a plurality of recessed walls generally defining a storage pocket, and wherein at least one of the walls includes a light source proximate thereto.

12. The vehicle seating assembly of claim 7, wherein the external peripheral gap extends across a first side, a second side, and a top side of the seatback panel assembly.

13. A vehicle seating assembly comprising:
   a support frame partially enclosed by a panel assembly;
   a seat cushion assembly proximate the panel assembly and having independent thigh extensions, wherein an external peripheral gap is defined between the panel assembly and the seat cushion assembly; and
   a light source disposed in a seat carrier and configured to emit light into the external peripheral gap.

14. The vehicle seating assembly of claim 13, wherein the seat carrier includes apertures configured to emit light therethrough.

15. The vehicle seating assembly of claim 13, wherein the light source defined in the seat carrier includes a light pipe.

16. The vehicle seating assembly of claim 13, wherein a predefined image is depicted on one of the seat carrier and the seat cushion assembly by the light source.

17. The vehicle seating assembly of claim 13, wherein the external peripheral gap extends across a first side, a second side, and a front side of the seat cushion assembly.

* * * * *